(12) United States Patent
Szasz et al.

(10) Patent No.: US 11,566,956 B2
(45) Date of Patent: Jan. 31, 2023

(54) PRESSURE SENSOR FOR A PIPE (71) Applicant: ABB Schweiz AG, Baden (CH)

(72) Inventors: Paul Szasz, Plankstadt (DE); Joerg Gebhardt, Mainz (DE); Paolo Giovio, Tremezzina (IT); Ilario Prina, Tremezzina (IT); Fabio Corbelli, Como (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/152,810

(22) Filed: Jan. 20, 2021

(65) Prior Publication Data
US 2021/0140842 A1    May 13, 2021

Related U.S. Application Data (63) Continuation of application No. PCT/EP2019/069524, filed on Jul. 19, 2019.

(30) Foreign Application Priority Data

Jul. 23, 2018 (EP) ..................................... 18185013

(51) Int. Cl.
*G01L 9/00* (2006.01)
*G01L 5/04* (2006.01)
(Continued)

(52) U.S. Cl.
CPC ........ *G01L 9/0002* (2013.01); *B65D 63/1018* (2013.01); *G01L 5/04* (2013.01); *G01L 19/0092* (2013.01); *G01L 27/005* (2013.01)

(58) Field of Classification Search
CPC ..... G01L 5/04; G01L 5/06; G01L 5/10; G01L 5/101; G01L 5/102; G01L 5/042;
(Continued)

(56) References Cited

U.S. PATENT DOCUMENTS

| 216,543 A | * | 6/1879 | Weaver | .............. B65D 63/1018 24/17 A |
| 3,535,937 A | | 10/1970 | Wiggins et al. | |

(Continued)

FOREIGN PATENT DOCUMENTS

| CN | 201184833 Y | 1/2009 |
| CN | 105339771 A | 2/2016 |

(Continued)

OTHER PUBLICATIONS

European Patent Office, Extended European Search Report in European Patent Application No. 18185013.2, 12 pp. (dated Mar. 15, 2019).

(Continued)

*Primary Examiner* — Herbert K Roberts
(74) *Attorney, Agent, or Firm* — Leydig, Voit & Mayer, Ltd.

(57) ABSTRACT

A pressure sensor for a pipe includes: a flexible strip; at least one strain sensing element; and a tensioning device. A first end of the flexible strip passes through a second end of the flexible strip. Between the first end of the flexible strip and the second end of the flexible strip, the flexible strip includes the at least one strain sensing element. The pressure sensor is attachable to the pipe. The first end of the flexible strip extends through or past the second end of the flexible strip. The tensioning device tensions the pressure sensor around the pipe.

17 Claims, 4 Drawing Sheets

(51) Int. Cl.
  *G01L 19/00* (2006.01)
  *G01L 27/00* (2006.01)
  *B65D 63/10* (2006.01)

(58) Field of Classification Search
  CPC . G01L 5/045; G01L 5/047; G01L 5/08; G01L 5/103; G01L 5/105; G01L 5/106; G01L 5/107; G01L 5/108; F16L 33/02; F16L 33/22; F16L 33/223; F16L 33/224; F16L 33/04; F16L 33/06; F16L 33/08; F16L 33/085; F16B 2/065; F16B 2/08; B65D 63/1018; B65D 63/1027
  See application file for complete search history.

(56) References Cited

U.S. PATENT DOCUMENTS

| | | | |
|---|---|---|---|
| 4,404,854 A | 9/1983 | Krempl et al. | |
| 4,905,353 A * | 3/1990 | Gari | F16L 33/04 24/286 |
| 6,536,820 B1 | 3/2003 | Dean et al. | |
| 7,093,496 B2 | 8/2006 | Hindman | |
| 7,367,239 B2 | 5/2008 | Engel | |
| 10,732,063 B2 | 8/2020 | Szasz et al. | |
| 2008/0312682 A1 * | 12/2008 | Shams | A61B 17/1327 606/203 |
| 2014/0251020 A1 | 9/2014 | Offer et al. | |
| 2014/0360279 A1 * | 12/2014 | Jenkins | G01L 1/22 73/756 |
| 2015/0035275 A1 * | 2/2015 | Sudar | F16L 21/002 285/337 |
| 2017/0328700 A1 | 11/2017 | Murphy et al. | |
| 2018/0283968 A1 | 10/2018 | Gasch et al. | |

FOREIGN PATENT DOCUMENTS

| | | |
|---|---|---|
| DE | 102015109450 A1 | 12/2016 |
| DE | 102015121425 A1 | 6/2017 |
| DE | 102015121455 A1 | 6/2017 |
| EP | 0042371 A1 | 12/1981 |
| EP | 0720006 A1 | 7/1996 |
| FR | 2725786 A1 | 4/1996 |
| GB | 2073423 A | 10/1981 |
| KR | 20130002479 U | 4/2013 |
| WO | WO 03064762 A1 | 8/2003 |
| WO | WO 2008042903 A2 | 4/2008 |
| WO | WO 2010132572 A1 | 11/2010 |
| WO | WO 2011082317 A2 | 7/2011 |

OTHER PUBLICATIONS

European Patent Office, International Preliminary Report on Patentability in International Patent Application No. PCT/EP2019/069524, 12 pp. (dated Jan. 26, 2021).

European Patent Office, International Search Report in International Patent Application No. PCT/EP2019/069524, 7 pp. (dated Jan. 27, 2020).

European Patent Office, Written Opinion in International Patent Application No. PCT/EP2019/069524, 11 pp. (dated Jan. 27, 2020).

* cited by examiner

PRESSURE SENSOR FOR A PIPE

CROSS-REFERENCE TO PRIOR APPLICATION

This application is a continuation of International Patent Application No. PCT/EP2019/069524, filed on Jul. 19, 2019, which claims priority to European Patent Application No. EP 18 185 013.2, filed on Jul. 23, 2018. The entire disclosure of both applications is hereby incorporated by reference herein.

FIELD

The present invention relates to a pressure sensor for a pipe, and to a method of measuring the pressure in a pipe with the pressure sensor.

BACKGROUND

Industrial pressure sensors are typical invasive field instruments. The pressure is measured by exposing a flexible diaphragm to the process fluid through a port or hole in the process pipe or vessel, and measuring the deflection of this diaphragm using various techniques (e.g. piezo-resistive, inductive, capacitive, etc.). Though such systems are established and widespread in use, offering high accuracy and reliability, they still have significant drawbacks:
- The process diaphragm, being exposed to often aggressive process media, is prone to corrosion and erosion, limiting the sensor's lifetime or increasing cost by using special materials;
- The actual measuring diaphragm is mostly separated from the process by a hydraulic circuit filled with oil; this limits the use temperature and can be the cause for accuracy limitations (e.g. due to thermal expansion of the oil) or contamination of the process in case of failure of the process diaphragm;
- Invasive sensors need open ports in the process; this causes high cost of installation (which may exceed the actual sensor's cost) and additional hazards of leakage, leading to increased explosion-proof requirements in the environment of such installations.

Non-invasive measurement of the pressure has been proposed to overcome these limitations. Many alternatives to measure the pressure through the pipe wall without drilling a hole have been described, though these have severe shortcomings, as described below:

WO2010/132572A1 describes a band and buckle for wrapping around and/or securing one or more objects. Specifically, the band is adapted to receive external objects and maintain the received external objects within the band. The external objects may include electronic devices, sensors, Radio Frequency Identification (RFID) devices or other similar objects. These objects may be used for identifying the objects that are secured by the band, determining information about the band or its surrounding, and other various functions.

US2017/328700A1 describes a cable tie having a strain sensing device incorporated therein. In one embodiment, the strain sensing device is a fiber Bragg grating (FBG), which is preferably molded within the strap. In this case, the cable tie further includes a socket in optical communication with the fiber Bragg grating for coupling of the cable tie to an external light source. In another embodiment, the strain sensing device is a mechanical fuse that activates in the presence of a predetermined amount of strain on the cable tie. The mechanical fuse is preferably disposed on the strap and is made of a fuse material having a mechanical strength lower than a mechanical strength of the material of the strap so that the mechanical fuse will fracture or deform earlier than the material of the underlying strap when both the fuse and the strap experience the same increasing strain.

GB2073423A describes that for sensing pressure changes within a pipe without the need to use a pressure sensor exposed to the interior of the pipe, a piezoelectric sensor has two points spaced longitudinally of the pipe. The sensor is embedded in foam rubber contained within a housing. The housing is clamped in position on the pipe by a strap and a screw threaded clamping member. One application of the sensor is in detecting the instant when pressure is released from a pneumatic braking system. The instant, so defined, can be used for testing the efficiency of the brakes. Alternatively the sensor can be used in fields of process control.

FR2725786A1 describes that a transducer includes two rigid half-jaws in the form of stainless steel strips which are jointed together at one side and closed at the other side by a lever and a spring loop. Piezoelectric, semi-tubular ceramic elements are fixed to their supports by intermediate pieces. The jointing is performed using cylindrical coils held together by a hollow pin. On the closure side one half-jaw has a coil to which the loop is hooked. The other has a coil trapping the rivet whereby the lever is fixed to the support.

U.S. Pat. No. 7,093,496 and EP720006 both describe a 2 or 3 part clamp, tensioned by a bolt equipped with strain gauges or an according force sensor which show a signal correlated to a pressure increase in the clamped pipe.

U.S. Pat. No. 3,535,937, CN201184833 and WO2011082317 rely on a bracket with an integrated force sensor to detect deformation of a clamped pipe under pressure.

However, these concepts have several shortcomings in common:
- The all use rather stiff, heavy clamp or bracket structures, which cannot comply with the pipe surface due to different tolerances and high stiffness; i.e. there is only contact at a few random points possible;
- Accordingly, the pipe deformation caused by internal pressure will be transferred incompletely to the clamp, the transfer function depending strongly on random mounting tolerances and position.
- An analytic correlation function between the sensor signal and the pipe pressure is then not possible, and the system will always need an initial calibration that is then used continuously—which is often not possible, if non-invasive installations are made on running processes.
- Additionally, the punctual metal-metal contact will always lead to frictional relative movements (e.g. due to thermal differences), which in turn will cause a sensor signal hysteresis and unpredictable zero offset under thermal cycling.

Alternatively:

EP42371 uses also a clamp, with an embedded elastic sensing element which is proposed to deliver a pressure dependent signal. This concept however suffers from tolerance related effects, resulting in non-uniform pre-compression of the elastic sensing element, with consequently undefined measurement behavior.

US20140251020 presents a rather thin, flexible clamp equipped with strain gauges, while KR201302479 also presents a solution with a relatively flexible bracket fixed by a specific A-shaped locking mechanism.

These concepts are better suited to achieve compliance between clamp and pipe wall surface. But they suffer from the direct metal-metal contact between pipe and clamp, being then still subject to friction-induced slip-stick effects.

Also, both patents lack an indication on how to achieve a uniform compliance of the clamp with the pipe surface. Incomplete compliance of the clamp with the pipe, however, will always lead to a reduced sensitivity of the strains on the clamp compared to those on the pipe, and consequently to the need of calibration of the system after each mounting process.

Also both patents lack any indication on how to derive a quantified pressure value from the measured sensor signal without an on-site calibration after mounting (which is in most cases not possible).

So, in summary, all prior art solutions suffer from three main limitations:
High stiffness clamp rings cannot comply with the actual pipe shape, both being subject to tolerances. Accordingly, the resulting signal strongly depends on local tolerances and needs complex calibration processes, which are not possible in real process environment;
The undefined compliance and random point contact of the clamp with the pipe results in a relative movement of the interface. Consequently, pressure changes of the pipe partly result in only local deformations without full transfer to the clamp, leading to poor measurement quality;
Friction at the random contact points between pipe and clamp, typically steel on steel, leads to slip-stick effects, and consequently to hysteresis and unpredictable zero offset. Due to the very high normal forces friction will always be high and standard lubricants are not effective in reducing this problem.

Accordingly, there is a need to improve the means by which pressures in pipes can be measured without drilling a hole into the pipe and without needing an on-site calibration after mounting of the non-invasive sensor.

SUMMARY

In an embodiment, the present invention provides a pressure sensor for a pipe, comprising: a flexible strip; at least one strain sensing element; and a tensioning device; wherein a first end of the flexible strip is configured to pass through a second end of the flexible strip, wherein, between the first end of the flexible strip and the second end of the flexible strip, the flexible strip comprises the at least one strain sensing element, wherein the pressure sensor is configured to attach to the pipe, wherein the first end of the flexible strip extends through or past the second end of the flexible strip, and wherein the tensioning device is configured to tension the pressure sensor around the pipe.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an improved pressure sensor for a pipe and a method of measuring the pressure in a pipe with the pressure sensor.

It should be noted that the following described aspects of the invention apply also for the pressure sensor and for the method using the pressure sensor.

In a first aspect, there is provided a pressure sensor for a pipe, the pressure sensor comprising:
a flexible strip;
at least one strain sensing element; and
a tensioning device.

A first end of the strip is configured to pass through a second end of the strip. Between the first end of the strip and the second end of the strip, the strip comprises the at least one strain sensing element. E.g. one or more strain sensing elements can be fixed, e.g. suitably glued, sputtered or printed at certain locations along the strip. The pressure sensor is configured to attach to a pipe, wherein the first end of the strip extends through the second end of the strip. The tensioning device is configured to tension the pressure sensor around the pipe to an extent which enables full compliance with the pipe contour.

In this manner, a pressure sensor has a design that allows for easy installation, and the controllable high tensioning compensates for geometric tolerances of a pipe, with the pressure sensor complying the pipe's outer contour over the required operational range in order that a quantitative measurement of pressure through the pipe wall can be made. Thus, the pressure sensor prevents any hysteresis or zero offset related to variations of the mounting conditions. To put this another way, a new pressure sensor enables a quantitative measurement pressure through the pipe or to be made through having a flexible strip, with special means to tension the strip without there being adverse affects such as frictional hysteresis, where strain sensing can then be utilised to measure the pressure.

To put this another way, the pressure sensor enables pressure to be measured in a pipe noninvasively, providing for an ability to retrofit on arbitrary pipes and quantifying the pressure change in the pipe without the need of calibration of the clamp together with pipe, i.e. without the need of an intrusive reference measurement.

In other words, the pressure sensor is wrapped around a pipe and tensioned by an appropriate structure—a tensioning device tensions the flexible strip to tension the pressure sensor around the pipe. A pre-tension can be chosen such that the flexible strip complies perfectly with the pipe surface, i.e., at any point of the circumference there is a close contact between the pipe and the flexible strip. This compliance ensures that any deformation of the pipe due to internal pressure change will be transferred without losses to the flexible strip itself. In this way the strain can be measured on the flexible strip, rather than on the pipe. In this manner accuracy and quality benefits are provided: strain gauges for accurate measurement can require complex application and heat treatment procedures, which cannot be applied in (often dirty and uncontrollable) process environment, and thus direct application to process pips is not possible. However, the present pressure sensor addresses this because strain gauges are applied to a prefabricated flexible strip that can then be attached to a pipe, thus providing for the highest measurement qualities and reproducibilities to be reached.

Thus, the strain measured by the pressure sensor is equal or very close to the strain on the pipe itself (or directly proportional by a known factor which can be related mainly to the stiffness of the flexible strip and of the pipe). As a result, the pressure in the pipe can be calculated from the measured strain and pipe geometry and material parameters without any specific calibration being required.

To put this another way, a quantitative measurement of pressure through the pipe wall is enabled by a pressure sensor comprising a flexible strip and tensioning device or force transfer mechanism that enables this to be achieved, without having to have a hole in the pipe; i.e. the pressure can be measured non-intrusively. Thus, the pressure sensor addresses the problem of how to adapt a pressure sensor to a pipe contour to an extent to get sufficiently reproducible strain measurements, from which the actual pipe deformation and so the pressure can be calculated analytically. This is enabled by the pressure sensor, through having a thin flexible strip, special tensioning device and providing sufficient tension, in order that the pressure sensor in the form of a flexible pressure sensing clamp can clamp onto a pipe with hypertension and compliance to the pipe in order that accurate and reproducible pressure measurements can be determined.

In an example, the strip is made from a material having a yield strength of at least 500 MPa.

In an example, the strip is made from a material having a yield strength of at least 1000 MPa.

In this way, long term stability of the system is provided, and details are provided relating to the flexibility of the strip in order to provide good compliance to the pipe surface and details on how sufficient tension can be provided.

In an example, the strip has a thickness less than 0.5 mm. In other words, further details are provided relating to the flexibility of the strip in order to provide good compliance to the pipe surface and details on how sufficient tension can be provided.

Thus, the strip has a thickness that enables the strip to be easily wrapped around a pipe and conform to the outer profile of the pipe.

In other words, the yield strength and thickness information of the flexible strip provide descriptive/limiting features to enable full compliance to the pipe surface and so consequently a sufficiently accurate and reproducible measurement to be made In an example, the first end of the strip comprises an end portion that is wider than a neck portion of the first end of the strip. The neck portion is configured to be contiguous with the second end of the strip when the pressure sensor is attached to the pipe. Thus, the first end of the strip is passed through the second end of the strip, and the neck portion of the first end then sits at the position of the section of the second end of the strip through which the first end was passed in attaching the strip to the pipe.

This facilitates the end of the strip being securely held, enabling the ends to be pushed apart to tension the strip.

In an example, the neck portion of the first end of the strip is configured not to touch the second end of the strip when the pressure sensor is attached to the pipe.

In this way, the arrangement avoids almost any frictional contact of the strip tensioning elements with the pipe surface when the strip is being tensioned around the pipe, mitigating the risk of friction induced errors. In this manner, the application of an appropriately high tension of the measurement strip is reproducibly enabled, where mechanically moving parts do not contact each other and/or are placed out of the contactor with a pipe, thus preventing hysteresis and errors that could be caused by friction and friction-induced slip-stick phenomena leading to unpredictable sensor signals. This provides for accurate pressure measurements due to the required magnitude and stability of tensioning of the strip is enabled.

In an example, the second end of the strip comprises an open loop, a hole, or a bifurcation.

Thus, the second end of the strip can have a hole or a bifurcation, through which the first end of the strip can be passed when being wrapped around a pipe. Thus, one end has a cut through it, and the strip can, if necessary, be twisted to enable the first end to pass through it. Or, the second end of the strip can have an open loop, through which the first end of the strip can be passed when being wrapped around a pipe. Thus, one end has a hole, and the strip can if necessary be twisted to enable the first end to pass through it. By having one end of the strip passing through the other end, this arrangement creates an intersection of the strip with itself, allowing a full 360 degree contact of the strip with the wrapped pipe. Thus with close contact to the pipe over the complete circumference losses in strain transfer between the pipe and the pressure sensor are mitigated, for example minimized to <5%. Thus, hysteresis is prevented that could cause errors in measurements due to friction, and at the same time the ability to apply the required magnitude of tension is enabled in a reproducible manner.

In an example, the tensioning device is configured to move the first end of the strip away from the second end of the strip when the pressure sensor is attached to the pipe to tension the pressure sensor.

Thus, adjustable tensioning of the pressure sensor to a pipe is provided in order that the required high tension can be provided in a reproducible manner. The tension required in the flexible strip for sufficient compliance with the pipe depends on several factors (diameter, stiffness, operational temperature range), and the pressure sensor can be attached with the required tension.

In an example, when the pressure sensor is attached to the pipe, the pressure sensor is configured such that the tensioning device does not directly touch the pipe.

An advantage of this arrangement is that only the thin sensor strip is in contact with the pipe surface, and the complete tensioning and clamping mechanism is detached from the pipe, thus avoiding point contacts with high stiffness elements of the clamp and mitigating the risk of friction induced errors. In this manner, the appropriately high tension can be provided to the flexible strip in a reproducible and stable manner in order that accurate pressure measurements can be made.

In an example, the tensioning device comprises two clamps and an adjustment part. The first end of the strip is configured to be connected to a first one of the two clamps and the second end of the strip is configured to be connected to a second one of the two clamps. When the pressure sensor is attached to the pipe the adjustment part is configured to move the first one of the two clamps away from the second one of the two clamps.

In other words, the two ends of the strip, which can at one end be "T"-shaped and at the other end be a bifurcation or open loop, can be clamped in solid clamping elements (clamps), which can serve as load introduction for the tensioning. The strip can be connected to the clamps in various ways, such as being bolted, screwed, clamped or welded, and have the function of introducing the tensioning forces into the strip with sufficient technical reliability. Thus, adjustable high tensioning of the pressure sensor to a pipe is provided in order that the required high tension can be provided in a reproducible manner to enable accurate pressure measurements to be made.

In an example, the adjustment part comprises a first threaded section and a second threaded section. The first one of the two clamps has a threaded bore configured to accept the first threaded section of the adjustment part and the second one of the two clamps has a threaded bore configured to accept the second threaded section of the adjustment part. When the pressure sensor is attached to the pipe, rotation of the adjustment part is configured to move the first one of the two clamps away from the second one of the two clamps.

In other words, tensioning of the pressure sensor is done via an adjusting bolt, which is placed between the two clamping elements (clamps) and which pushed the two clamping elements apart, and as the strip is attached to the two clamps, with one end passing through the other end, correct tensioning of the strip is enabled. The pretension can be quantified by known technical means, for example measurement of the bolt torque of the adjustment bolt, using a strain gauge equipped adjustment bolt, or using the signal of the strain gauges on the pressure sensor itself.

Examples of pre-tensions are 10%, 20%, 50%, 80% or 90% of the yield strength of the strip's material.

In an example, the pressure sensor comprises a material layer configured to be situated between at least a part of the strip and the pipe when the pressure sensor is attached to the pipe. The material layer has a shear modulus less than a shear modulus of the strip.

In an example, a thickness of the material layer is less than a thickness of the strip.

Instead of a solid material layer, or in addition to it, a lubrication material can be used.

In this manner, quantitative measurements of pressure can be improved through minimising friction induced hysteresis and increasing accuracy. Thus a sufficiently good strain measurement is enabled for flexibility of the clamp, and proper tensioning especially provided tensioning device and through the minimising of friction by an appropriate interface, such as the low modulus thin layer that can for example be via lubrication or polymer foil.

In a second aspect, there is provided a pressure sensor for a pipe, the pressure sensor comprising:
 a plurality of flexible strips;
 at least one strain sensing element; and
 at least one tensioning device.

Each strip has a first end and a second end. The first end of each strip is configured to pass through the second end of each strip. Between the first end of at least one strip and the second end of the at least one strip, the at last one strip comprises the at least one strain sensing element. The pressure sensor is configured to attach to a pipe. The first end of each strip passes through or past the second end of an adjacent strip. The at least one tensioning device is configured to tension the pressure sensor around the pipe.

In a third aspect, there is provided a method of measuring the pressure in a pipe with the pressure sensor of the first aspect, comprising:
 b) mounting the pressure sensor to the pipe by passing the first end of the strip through the second end of the strip and moving the two ends of the strip to tension the strip with a high pre-tension;
 c) obtaining at least one strain measurement from an least one strain sensing element;
 d) calculating pressure related circumferential strain on the pipe from the at least one strain measurement; and
 e) calculating the pressure in the pipe from the circumferential strain.

In an example, the method comprises step a), obtaining at least one calibration strain measurement from the at least one strain sensing element for the pressure sensor mounted to a test pipe having a known pressure, and wherein step d) comprises calculating the pressure related circumferential strain from a change relative to the at least one calibration strain measurement.

In other words, the quantitative measurement of pressure through the pipe wall is enabled via an algorithm used to calculate the pipe pressure from the measured strain via a transfer function.

In an example, step c) comprises measuring at least one temperature of the pressure sensor, and wherein step d) comprises utilizing the measured at least one temperature.

In an example, step a) comprises measuring at least one calibration temperature of the pressure sensor, and wherein step d) comprises utilizing the measured at least one calibration temperature.

In other words, the quantitative measurement of pressure through the pipe wall enabled via an algorithm used to calculate the pipe pressure from the measured strain via a transfer function is improved via improvement of the accuracy of the pressure determination algorithm through utilisation of additional measurements of temperature and calibration.

The above aspects and examples will become apparent from and be elucidated with reference to the embodiments described hereinafter.

Figure 1:
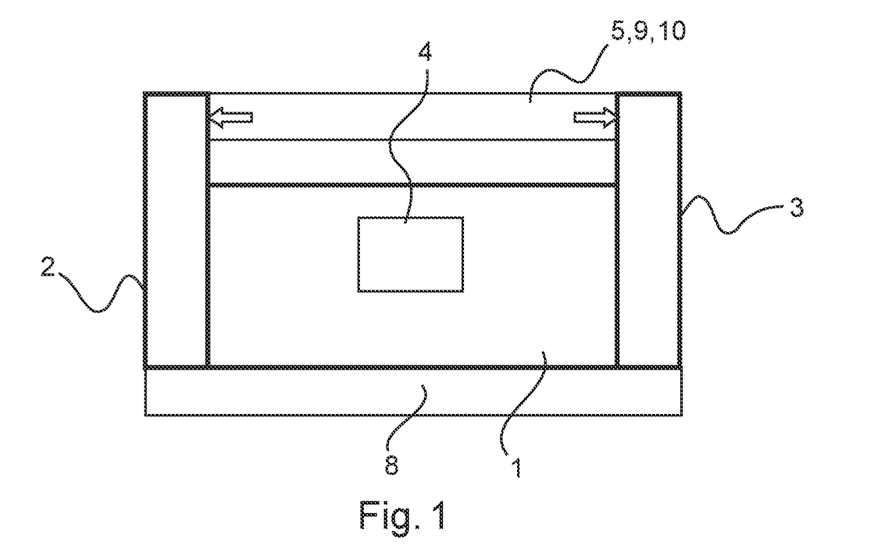
FIG. 1 shows a schematic representation of a pressure sensor for a pipe.

FIG. 1 shows a schematic principle drawing of an example of a pressure sensor for a pipe. The pressure sensor comprises a flexible strip 1, at least one strain sensing element 4, and a tensioning device 5, 9, 10. A first end 2 of the flexible strip 1 is configured to pass through, or just pass, through, a second end 3 of the flexible strip 1. Between the first end 2 of the flexible strip 1 and the second end 3 of the flexible strip 1, the flexible strip 1 comprises the at least one strain sensing element 4. The pressure sensor is configured to attach to a pipe 6, wherein the first end 2 of the flexible strip 1 extends through the second end 3 of the flexible strip 1. The tensioning device 5, 9, 10 is configured to tension the pressure sensor around the pipe surface. The pressure can be calculated from the measured strain and system parameters.

In an example, the flexible strip is sufficiently flexible to enable full compliance of the strip to the pipe contour at the pretension of at least 100 MPa, preferably 200-400 MPa longitudinal tension in the strip after mounting. Thus, the flexible strip has a sufficient compliance, enabling an analytic calculation of the pressure from the strain to be determined without additional calibration of the pressure sensor on that specific pipe.

In an example, the flexible strip is made from a high strength, high elasticity material such as spring steel or similar.

In an example, a width of the strip is chosen in order that it can accommodate the strain sensing element(s) that measure strains in the strip caused by pressure variations in the pipe.

This design also enables more than one pressure sensor to be used to measure the pressure for larger diameter pipes, because the first end of a first strip can pass through the second end of a second strip, and the first end of the second strip can pass through the second end of the first strip. Thus, one, two, three or any number of pressure sensors can be linked together to form an overall pressure sensor.

Thus, the high tension, and resulting compliance to the pipe surface and full 360 degree contact to the pipe allows the transmission of pipe surface strains with minimal losses to the pressure sensor. Additionally, the close contact between the pressure sensor and pipe enables a good heat transfer, resulting in practically identical temperatures in both the pressure sensor and pipe under all operational conditions. This minimizes temperature-induced measurement deviations, which would otherwise be unavoidable. As a result, the pressure can be calculated from the strain changes measured on the strip surface directly using analytical formulae describing the behaviour of pipes under internal pressure. Considering known analytical formulae for the stress and strain in thick walled pipes under internal pressure, the following calculation formula can be derived to calculate the internal pressure from the circumferential strain measured on the pipe surface:

$$p = \varepsilon_t \times \frac{E_{pipe(T)}}{2 - v_{pipe(T)}} \times \frac{4 \times t_{pipe} \times (d_{o_{pipe}} - t_{pipe})}{(d_{o_{pipe}} - 2 \times t_{pipe})^2} = \varepsilon_t \times k_{elast} \times k_{geom}$$

Where E is the Young's modulus of the pipe material, v is the Poisson's ratio of the pipe material, (both temperature dependent), t is the pipe wall thickness and do is the pipe outer diameter. $\varepsilon_t$ is the circumferential or tangential strain on the pipe surface. Its value is derived from the circumferential strain on the clamp surface measured with pre-installed strain gauges. Though the two strains are almost identical, some corrections are still needed for higher accuracy.

E.g. the clamp will inhibit locally the pipe expansion under pressure—this can beneficially be accounted for by an appropriate correction considering the stiffness ratios of pipe wall and clamp. As the clamp is supposed to be very thin, this correction will typically not exceed 2-3%. Using clamp materials with adapted thermal expansion but reduced Young's modulus (e.g. Titanium) the effect can further be reduced.

The thermal expansion coefficient of the clamp will mostly not be fully identical to that of the pipe (difference in the order of 1 ppm/° C. may be realistic). This difference can also be easily corrected by appropriate calculation.

Thus, a specific method of how a measured strain can be transferred to pressure information can be as follows:

a) measure the pipe geometry (e.g. diameter, wall thickness);

b) mount the clamp on the pipe, and tensioning to reach full compliance to the pipe (>100 MPa, and preferably at least 200-400 MPa);

c) set strain value at the mounting to zero;

d) measure strain and temperature deviation from mounting state on clamp;

e) calculate temperature-dependent material data of pipe (elastic and thermal) using information determined from d);

f) calculate elastic transfer function between the clamp and pipe strain using information from a); and g) using the above detailed equation, calculate pressure change relative to mounting state analytically using information from c), d), e) and f).

To put this another way, a pressure sensor is provided for non-invasive pressure sensing on process pipes. It solves the problems of prior devices related to poor load transfer between pipe and clamp and uncontrollable hysteresis and zero offset due to slip-stick effects. The solution is based on the use of a high strength, high flexibility strip equipped with strain sensing elements, tensioned by a specific device without direct contact of stiff components to the pipe, resulting in high compliance of the measurement strip and so ideal transfer of pipe strains to clamp strains. Further, the pressure in the pipe can be calculated from the measured strain on the clamp, from geometric and elastic properties of the pipe and from temperature information in clamp and tensioning elements.

In an example, the pressure sensor comprises one or more temperature sensors, such as Pt100. These can be used to measure the temperature of the strip, and if required also the temperature of the tensioning device.

In an example, the at least one strain sensing element comprises a strain gauge (foil, semiconductor, sputtered or printed). In an example, the at least one strain sensing element comprises an optical fibre wrap, or any other strain sensing means according to the state of the art.

According to an example, the flexible strip is made from a material having a yield strength of at least 500 MPa.

According to an example, the flexible strip is made from a material having a yield strength of at least 1000 MPa.

According to an example, the flexible strip has a thickness less than 0.5 mm.

In an example, the thickness of the flexible strip is less than 0.4 mm.

In an example, the thickness of the flexible strip is in the range 0.2 mm to 0.3 mm.

In an example, the thickness of the flexible strip is less than 0.3 mm.

In an example, the thickness of the flexible strip is less than 0.2 mm.

According to an example, the first end of the flexible strip comprises an end portion that is wider than a neck portion of the first end of the flexible strip. The neck portion is configured to be contiguous with the second end of the flexible strip when the pressure sensor is attached to the pipe.

In an example, the first end of the strip is "T" shaped.

According to an example, the neck portion of the first end of the flexible strip is configured not to touch the second end of the flexible strip when the pressure sensor is attached to the pipe.

According to an example, the second end of the flexible strip comprises an open loop or a bifurcation.

According to an example, the tensioning device is configured to move 7 the first end of the flexible strip away from the second end of the strip when the pressure sensor is attached to the pipe to tension the pressure sensor.

In an example, the tensioning device is configured to tension the flexible strip to 200 MPa.

In an example, the tensioning device is configured to tension the flexible strip to 300 MPa.

In an example, the tensioning device is configured to tension the flexible strip to 400 MPa.

In an example, the tensioning device is configured to tension the flexible strip up to 500 MPa.

In an example, the tensioning device is configured to tension the flexible strip up to the yield strength of the flexible strip. However, this is not exceeded.

In this manner, a high tension is provided that provides compliance of the flexible strip to the pipe and prevents loosening of the pressure sensor in operation due to thermal differences.

High tensions, up to 500 MPa, or even 900 MPa, may be applied for a higher safety margin against loosening, especially considering thermal expansion differences. Thus, in an example to ensure a small effect of temperature variations in operation, the material of the flexible strip can be chosen such that it has a small difference of thermal expansion coefficient compared with the pipe material.

According to an example, when the pressure sensor is attached to the pipe, the pressure sensor is configured such that the tensioning device does not directly touch the pipe.

An advantage of this arrangement is that only the thin sensor strip is in contact with the pipe surface, and the complete tensioning and clamping mechanism is detached from the pipe, thus avoiding point contacts with high stiffness elements of the clamp and mitigating the risk of friction induced errors.

According to an example, the tensioning device 5, 9, 10 comprises two clamps 10 and an adjustment part 9. The first end of the flexible strip is configured to be connected to a first one of the two clamps and the second end of the flexible strip is configured to be connected to a second one of the two clamps. When the pressure sensor is attached to the pipe the adjustment part is configured to move the first one of the two clamps away from the second one of the two clamps.

In an example, the adjustment part is aligned along a centre line of the strip. Thus the adjustment part is designed to push the two ends of the strip apart in a controllable way, thus creating a tensile stress in the clamp strip, while the tensioning "bolt" is under compressive stress.

According to an example, the adjustment part comprises a first threaded section and a second threaded section. The first one of the two clamps has a threaded bore configured to accept the first threaded section of the adjustment part and the second one of the two clamps has a threaded bore configured to accept the second threaded section of the adjustment part. When the pressure sensor is attached to the pipe, rotation of the adjustment part is configured to move the first one of the two clamps away from the second one of the two clamps.

According to an example, the pressure sensor comprises a material layer interface 8 configured to be situated between at least a part of the flexible strip and the pipe when the pressure sensor is attached to the pipe. The material interface layer has a shear modulus less than a shear modulus of the strip.

In an example, the shear modulus of the material layer is significantly less than the shear modulus of the strip.

In an example, the shear modulus of the material layer is in the range 0.1-5 GPa.

This low shear modulus enables a shear deformation during mounting and in service, thus preventing the interface from slipping.

In an example, the material interface layer is made of a polymer or soft metal, e.g. high strength, high temperature polymer foil like Mylar or Kapton, though not limited to these. This ensures a high stability of the zero point of the system.

An additional advantage of the material interface layer, such as a polymer layer, is that crevice corrosion is also prevented, making the system highly stable over long time. The layer can be introduced between the strip and the pipe or added as an anti-friction coating to the strip inner surface. This also serves to help eliminate the friction-induced slip-stick phenomena leading to unpredictable zero offset and hysteresis.

In an example, the material interface layer forms an interface layer placed between the pipe and strip covering at least the complete contact area between pipe and strip, that has high elasticity and low creep at service temperatures of the system, and that can have a lubricant such as grease on the surface.

According to an example, a thickness of the material interface layer is less than a thickness of the strip.

In an example, the thickness is between 10 and 100 μm.

Figure 2:
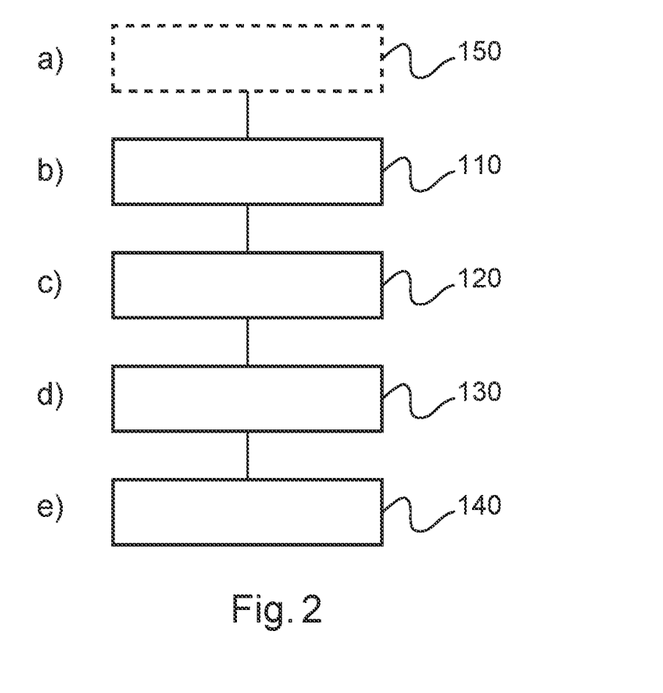
FIG. 2 shows a method of measuring pressure in a pipe with the pressure sensor of FIG. 1.
Figure 3:
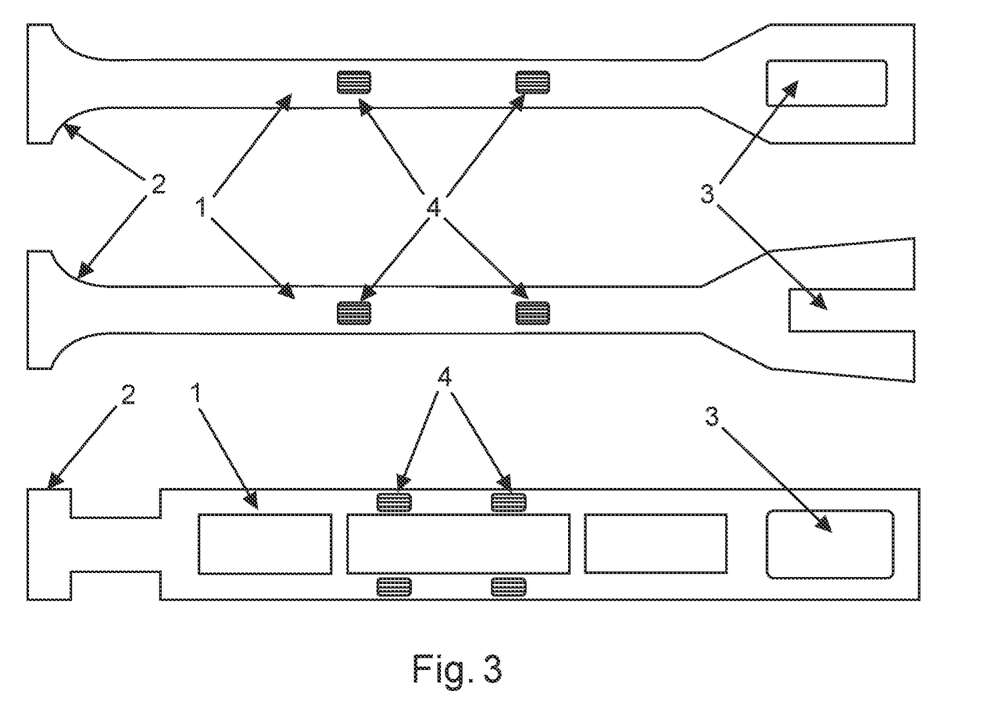
FIG. 3 shows different embodiments of a flexible strip and strain sensing elements of the pressure sensor of FIG. 1.

FIG. 2 shows a method 100 of measuring the pressure in a pipe with the pressure sensor described with respect to FIG. 1. The method 100 comprises:

in a mounting step 110, also referred to as step b), mounting the pressure sensor to the pipe by passing the first end of the strip through the second end of the strip and moving 7 the two ends of the strip to tension the strip with a high pre-tension;

in an obtaining step 120, also referred to as step c), obtaining at least one strain measurement from the a least one strain sensing element;

in a calculating step 130, also referred to as step d), calculating pressure related circumferential strain on the pipe from the at least one strain measurement; and in a calculating step 140, also referred to as step e), calculating the pressure in the pipe from the circumferential strain.

According to an example, the method comprises step a) obtaining 150 at least one calibration strain measurement from the at least one strain sensing element for the pressure sensor mounted to a test pipe having a known pressure. Step d) can then comprise calculating the pressure related circumferential strain from a change relative to the at least one calibration strain measurement.

According to an example, step c) comprises measuring at least one temperature of the pressure sensor, and wherein step d) comprises utilizing the measured at least one temperature.

In an example, the at least one temperature comprises a temperature of the strip.

In an example, the at least one temperature comprises a temperature of the tensioning device.

According to an example, step a) comprises measuring at least one calibration temperature of the pressure sensor, and wherein step d) comprises utilizing the measured at least one calibration temperature.

In an example, the at least one calibration temperature comprises a temperature of the strip.

In an example, the at least one calibration temperature comprises a temperature of the tensioning device.

In an example, in step d) pressure related circumferential strain changes on the pipe relative to the installation are calculated based on the measured strain change on the flexible strip, information on elastic stiffness ratio between the flexible strip and pipe, on the measured temperatures and on thermal expansion coefficient differences between flexible strip and pipe In an example, in step e) the pressure in the pipe is calculated from the above determined circumferential strain on the pipe, the pipe geometry and elastic properties of the pipe material using an analytical function.

The pressure sensor and method of measuring pressure are now described in more detail with reference to FIGS. 3-8.

Figure 4:
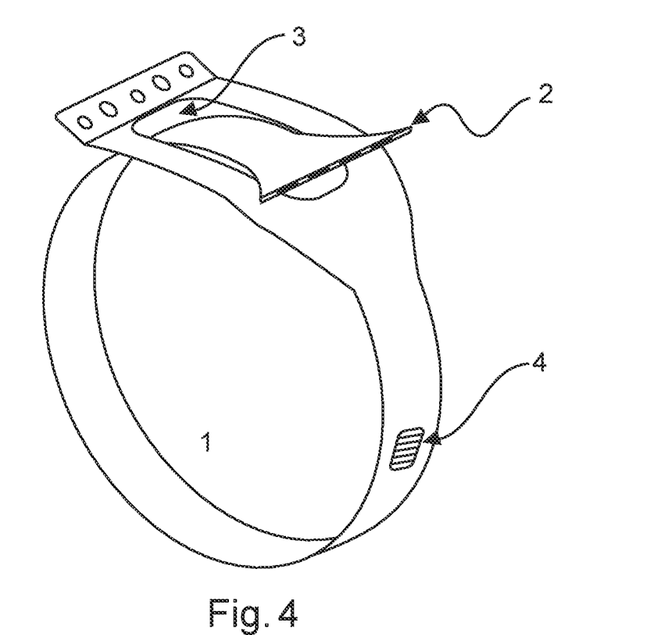
FIG. 4 shows an example of the top embodiment of FIG. 3, positioned as if to be attached to a pipe.

The pressure sensor enables non-invasive pressure sensing on process pipes. The pressure sensor has a high strength, high flexibility strip 1, equipped with strain sensing elements 4. The strip 1 has specific end sections 2, 3 allowing intersection of the strip with itself when wrapped around the process pipe 6, and tensioned with a specific device 5, 9, 10, without direct contact of stiff components to the pipe. As shown, in FIG. 3 the flexible strip 1 can have different forms, whilst allowing one end to pass through the other end, and not be in contact with each other when wrapped around the pipe, as shown in FIG. 4.

Figure 5:
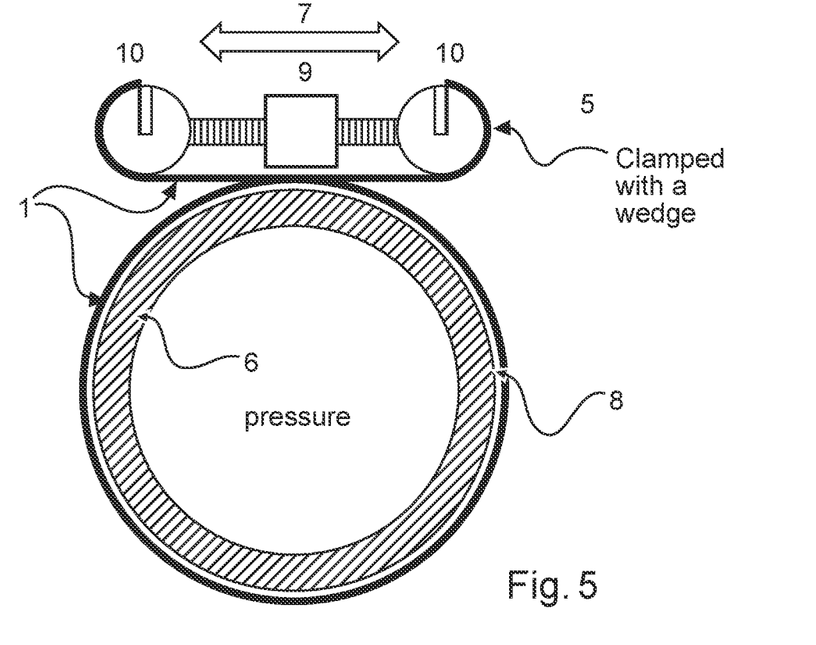
FIGS. 5, 6 and 7 show detailed examples of a pressure sensor of FIG. 1 attached to a pipe.
Figure 6:
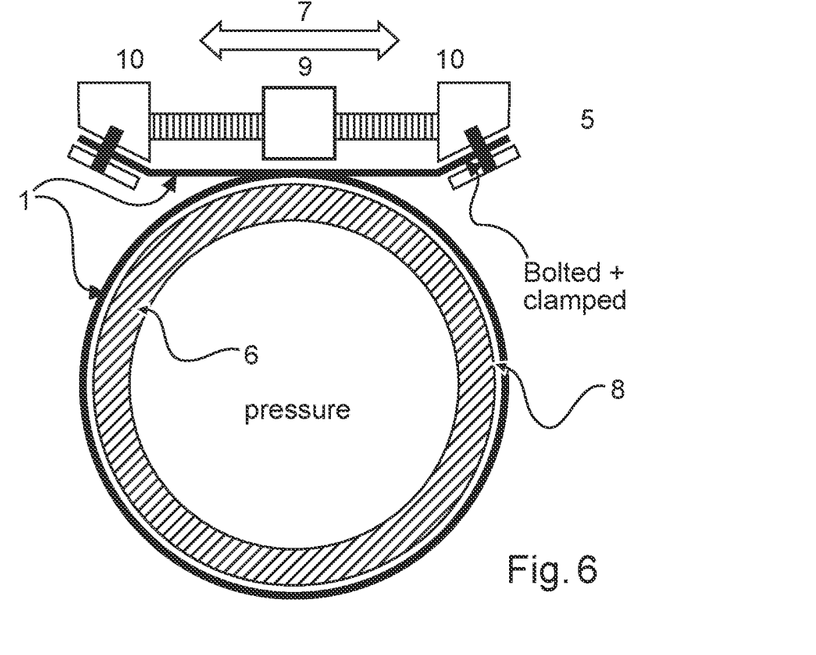
Figure 7:
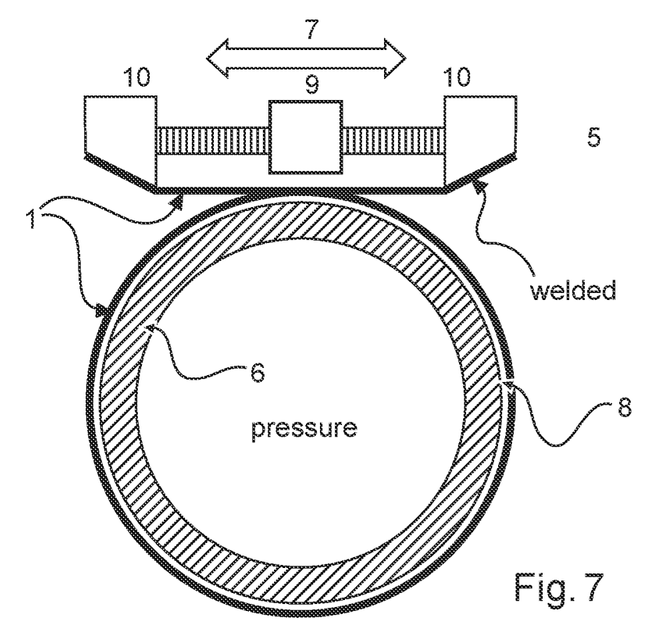

As shown in FIGS. 5-7, the tensioning device 5, 9, 10 is formed from two clamps 10 and an adjustment part 9, which in a detailed example is an adjustment bolt. The two ends 2, 3 of the flexible strip can be attached to the clamps 10 in various ways, such as by clamping, bolting, and welding. Then, when the pressure sensor is attached to a pipe, with end 2 passed through end 3, and with the ends connected to the clamps 10, the adjustment bolt 9 can be used to move the two clamps away from each other to tension the flexible strip and the pressure sensor about the pipe.

Figure 8:
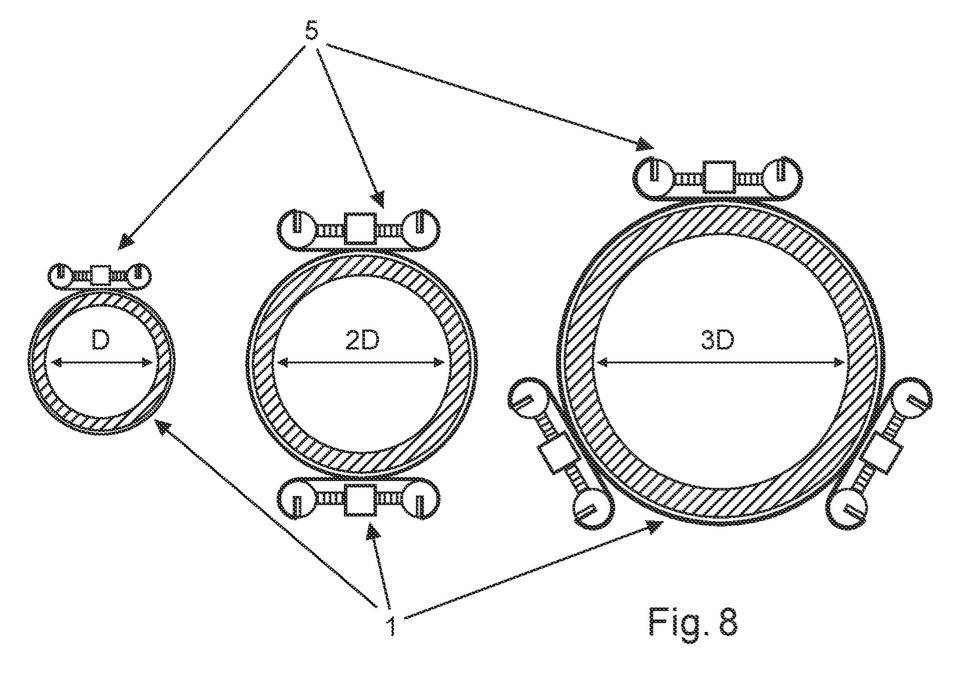
FIG. 8 shows how a pressure sensor of FIG. 5-7, can be used in series to attach to pipes of differing diameters.

As shown in FIG. 8, the way that one end of the flexible strip can be passed through the other end means that one strip can pass through itself to wrap around a pipe. Pressure sensors having different lengths of flexible strip 1 can then be used to wrap around pipes of different diameters. However, due to the way that one end of the flexible strip can pass through the other end, a first strip can connect to a different strip to enable pressures of wider diameter pipes to be measured. Each separate part attached around the pipe could be a fully functioning pressure sensor, with strain measuring elements. However, only one needs to have the strain measuring elements and the other parts are then the flexible strip, as described above, with tensioning means.

The following relate to a specific embodiment of the pressure sensor, described in terms of hardware and methodology by which pressure determination is made Hardware:

One or more flexible clamping strips, with circumferential strain sensors (strain gauges). The one or more flexible clamping strips are tightened around the pipe with the defined high tension, such that full compliance to the pipe contour is ensured, using a special tensioning device.

The flexibility and pre-tension of the one or more flexible clamping strips are defined by achieving full compliance of the one or more flexible clamping strips to the pipe contour. In this specific embodiment this is achieved through each flexible clamping strip having the following parameters: the thickness less than 0.5 mm, tensioning provided by the special tensioning device of greater than 100 MPa, and a yield strength of at least 1000 MPa.

As a result the clamping strain will correlate in a repeatable manner to the pipe strain corresponding to an analytically calculable transfer function without calibration being required for the pipe and pressure sensor combination.

The special tensioning device is used to apply a defined pre-tension of greater than 100 MPa, as described above.

The overall design prevents friction/slip-stick induced hysteresis through:

There being no contact of tensioning/adjustable components of the pressure sensor with the pipe, i.e. the pipe is contacted only by the uniform one or more flexible clamping strips.

The interface between the one or more flexible clamping strips and the pipe consists of a material having a low shear modulus (e.g. lubrication and/or polymer foil).

The ends of the one or more flexible clamping strips that interact with the special tensioning device, have over crossing ends with a hammer/loop design that ensures that bending stresses in the ends of the flexible clamping strips are prevented during load introduction.

The tensioning device, in the form of a bolt moving the ends of the flexible camping strip away from each other, operates under compression providing for reliability over the longer-term.

Pressure determination methodology utilising the above described hardware:

a) measure the pipe geometry (e.g. diameter, wall thickness);

b) mount the clamp on the pipe, and tensioning to reach full compliance to the pipe (>100 MPa, and preferably at least 200-400 MPa);

c) set strain value at the mounting to zero;

d) measure strain and temperature deviation from mounting state on clamp;

e) calculate temperature-dependent material data of pipe (elastic and thermal) using information determined from d);

f) calculate elastic transfer function between the clamp and pipe strain using information from a); and g) using the above detailed equation, calculate pressure change relative to mounting state analytically using information from c), d), e) and f).

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A pressure sensor for a pipe, comprising:
a flexible strip;
at least one strain sensing element; and
a tensioning device;
wherein a first end of the flexible strip is configured to pass through a second end of the flexible strip,
wherein, between the first end of the flexible strip and the second end of the flexible strip, the flexible strip comprises the at least one strain sensing element,
wherein the pressure sensor is configured to attach to the pipe,
wherein the first end of the flexible strip extends through the second end of the flexible strip,
wherein the tensioning device is configured to tension the pressure sensor around the pipe, and
wherein the first end of the flexible strip comprises an end portion that is wider in a direction perpendicular to both a direction from the first end to the second end and a thickness direction of the flexible strip than a width in the perpendicular direction of a neck portion of the first end of the flexible strip.

2. The pressure sensor according to claim 1, wherein the flexible strip comprises a material having a yield strength of at least 500 MPa.

3. The pressure sensor according to claim 1, wherein the flexible strip has a thickness of less than 0.5 mm.

4. The pressure sensor according to claim 1,
wherein the neck portion is configured to be contiguous with the second end of the flexible strip when the pressure sensor is attached to the pipe.

5. The pressure sensor according to claim 4, wherein the neck portion of the first end of the flexible strip is configured not to touch the second end of the flexible strip when the pressure sensor is attached to the pipe.

6. The pressure sensor according to claim 1, wherein the second end of the flexible strip comprises an open loop or a bifurcation.

7. The pressure sensor according to claim 1, wherein the tensioning device is configured to move the first end of the flexible strip away from the second end of the flexible strip when the pressure sensor is attached to the pipe to tension the pressure sensor.

8. The pressure sensor according to claim 1, wherein when the pressure sensor is attached to the pipe, the pressure sensor is configured such that the tensioning device does not directly touch the pipe.

9. The pressure sensor according to claim 1, wherein the tensioning device comprises two clamps and an adjustment part,
wherein the first end of the flexible strip is configured to be connected to a first one of the two clamps and the second end of the flexible strip is configured to be connected to a second one of the two clamps, and
wherein when the pressure sensor is attached to the pipe the adjustment part is configured to move the first one of the two clamps away from the second one of the two clamps.

10. The pressure sensor according to claim 9, wherein the adjustment part comprises a first threaded section and a second threaded section,
wherein the first one of the two clamps has a threaded bore configured to accept the first threaded section of the adjustment part and the second one of the two clamps has a threaded bore configured to accept the second threaded section of the adjustment part, and
wherein when the pressure sensor is attached to the pipe, rotation of the adjustment part is configured to move the first one of the two clamps away from the second one of the two clamps.

11. The pressure sensor according to claim 1, further comprising a material interface layer configured to be situated between at least a part of the flexible strip and the pipe when the pressure sensor is attached to the pipe,
wherein the material interface layer has a shear modulus less than a shear modulus of the flexible strip.

12. The pressure sensor according to claim 11, wherein a thickness of the material interface layer is less than a thickness of the flexible strip.

13. A method of measuring the pressure in the pipe with the pressure sensor of claim 1, comprising:
b) mounting the pressure sensor to the pipe by passing the first end of the flexible strip through the second end of the flexible strip and moving the two ends of the flexible strip to tension the flexible strip with a pre-tension;
c) obtaining at least one strain measurement from the at least one strain sensing element;
d) calculating a pressure related circumferential strain on the pipe from the at least one strain measurement; and
e) calculating the pressure in the pipe from the pressure related circumferential strain.

14. The method according to claim 13, further comprising:
a) obtaining at least one calibration strain measurement from the at least one strain sensing element for the pressure sensor mounted to a test pipe having a known pressure,
wherein step d) comprises calculating the pressure related circumferential strain from a change relative to the at least one calibration strain measurement.

15. The method according to claim 14, wherein step c) comprises measuring at least one temperature of the pressure sensor, and
wherein step d) comprises utilizing the measured at least one temperature.

16. The method according to claim 15, wherein step a) comprises measuring at least one calibration temperature of the pressure sensor, and
wherein step d) comprises utilizing the measured at least one calibration temperature.

17. A pressure sensor for a pipe, comprising:
a plurality of flexible strips;
at least one strain sensing element; and
at least one tensioning device,
wherein each strip of the plurality of flexible strips has a first end and a second end,
wherein the first end of each strip is configured to pass through the second end of each strip, wherein, between the first end of at least one strip and the second end of the at least one strip, at least one strip of the plurality of flexible strips comprises the at least one strain sensing element, wherein the pressure sensor is configured to attach to a pipe, wherein the first end of each strip passes through the second end of an adjacent strip, wherein the at least one tensioning device is configured to tension the pressure sensor around the pipe, and wherein the first end of the flexible strip comprises an end portion that is wider in a direction perpendicular to both a direction from the first end to the second end and a thickness direction of the flexible strip than a width in the perpendicular direction of a neck portion of the first end of the flexible strip.

\* \* \* \* \*